United States Patent
Glaudel et al.

(10) Patent No.: US 9,631,993 B2
(45) Date of Patent: Apr. 25, 2017

(54) SELF-HEATED MEMS BASED CAPACITANCE DIAPHRAGM GAUGE

(75) Inventors: Stephen P. Glaudel, Lebanon, NJ (US); Ken Tinsley, Frisco, TX (US)

(73) Assignee: Brooks Instrument, LLC, Hatfield, PA (US)

( * ) Notice: Subject to any disclaimer, the term of this patent is extended or adjusted under 35 U.S.C. 154(b) by 1036 days.

(21) Appl. No.: 13/316,081

(22) Filed: Dec. 9, 2011

(65) Prior Publication Data
US 2012/0197554 A1 Aug. 2, 2012

Related U.S. Application Data

(60) Provisional application No. 61/421,878, filed on Dec. 10, 2010.

(51) Int. Cl.
| | |
|---|---|
| *G01L 9/12* | (2006.01) |
| *G01L 15/00* | (2006.01) |
| *G01L 9/00* | (2006.01) |
| *G01L 19/04* | (2006.01) |

(52) U.S. Cl.
CPC .......... *G01L 9/0072* (2013.01); *G01L 15/00* (2013.01); *G01L 19/04* (2013.01)

(58) Field of Classification Search
CPC ..... G01L 9/0073; G01L 9/0072; G01L 19/04; G01L 15/00

USPC .......................................................... 702/52
See application file for complete search history.

(56) References Cited

U.S. PATENT DOCUMENTS

| | | | | |
|---|---|---|---|---|
| 4,996,627 | A * | 2/1991 | Zias et al. ................... | 361/283.4 |
| 6,701,790 | B2 * | 3/2004 | Fortner .................... | G01K 1/20 |
| | | | | 374/143 |
| 7,146,861 | B1 | 12/2006 | Cook et al. | |
| 7,564,338 | B2 * | 7/2009 | Muehlheim ........... | B81B 7/0012 |
| | | | | 338/23 |
| 7,841,239 | B2 * | 11/2010 | Miyashita ........... | G01L 19/0092 |
| | | | | 73/718 |
| 2007/0068266 | A1 * | 3/2007 | Fujimori et al. ................ | 73/724 |
| 2009/0114029 | A1 * | 5/2009 | Ide ........................ | G01L 9/0072 |
| | | | | 73/724 |
| 2010/0192694 | A1 * | 8/2010 | Hammerschmidt ............ | 73/708 |

OTHER PUBLICATIONS

International Search Report and Written Opinion date mailed Oct. 9, 2012; PCT International Application No. PCT/US2011/064491.

* cited by examiner

*Primary Examiner* — Matthew G Marini
*Assistant Examiner* — Leo T Hinze
(74) *Attorney, Agent, or Firm* — McGuireWoods LLP

(57) ABSTRACT

The disclosed embodiments include a capacitance diaphragm gauge that includes a self-heated micro-electro-mechanical-system sensor for measuring pressure. The self-heated micro-electro-mechanical-system has at least one integrated heater component and at least one membrane on the self-heated micro-electro-mechanical-system.

18 Claims, 6 Drawing Sheets

SELF-HEATED MEMS BASED CAPACITANCE DIAPHRAGM GAUGE

This application claims the benefit of U.S. Provisional Application No. 61/421,878, filed on Dec. 10, 2010 in the name of inventor Stephen P. Glaudel, titled "Self-Heated MEMs Based Capacitance Diaphragm Gauge," which is hereby incorporated by reference.

BACKGROUND OF THE INVENTION

Numerous devices are available to measure pressure, such as Pirani-gauges, capacitance manometers or capacitance diaphragm gauges (CDGs). For example, FIG. 1 illustrates a design of a capacitance diaphragm gauge 100 as disclosed in U.S. Pat. No. 6,701,790. The disclosed capacitance diaphragm gauge utilizes a temperature regulator with two controlled zones (120 and 130) for regulating the temperature of a variable capacitance sensor 110 to reduce temperature gradients that form within the sensor.

Although the above design reduces temperature gradients that form within the sensor, there remains a transient accuracy and repeatability issue because of the difficulties in maintaining an isothermal profile (uniform temperature) of the sensor due in part to the large size and mass of the sensor.

Accordingly, one or more of the disclosed embodiments provide a novel solution to improve the temperature uniformity of the sensor and thus, improve accuracy and repeatability of capacitance diaphragm gauges.

SUMMARY OF THE INVENTION

Example embodiments include a self-heated micro-electro-mechanical-system sensor for measuring pressure that includes an electrode chip and a membrane chip bonded together by thermo-compression bonding. The self-heated micro-electro-mechanical-system sensor includes multiple membranes, each membrane having a different pressure measuring range. The self-heated micro-electro-mechanical-system sensor includes four heater components located substantially centered on each side of a four sides of the self-heated micro-electro-mechanical-system sensor. The self-heated micro-electro-mechanical-system sensor also includes five temperature sensors consisting of four temperature sensors located on the membrane chip and one temperature sensor located on the electrode chip of the self-heated micro-electro-mechanical-system sensor.

In another embodiment, a capacitance diaphragm gauge is disclosed that includes a self-heated micro-electro-mechanical-system sensor for measuring pressure. The self-heated micro-electro-mechanical-system has at least one integrated heater component and at least one membrane on the self-heated micro-electro-mechanical-system.

Still, in another embodiment, a capacitance diaphragm gauge is disclosed that includes a main housing and a replaceable cartridge operable to be connected and disconnected from the main housing. The replaceable cartridge includes a self-heated micro-electro-mechanical-system sensor for measuring pressure, an analog front end coupled to the self-heated micro-electro-mechanical-system sensor, and a memory component for storing calibration data.

For a more thorough understanding of the present invention, and advantages thereof, reference is now made to the following descriptions taken in conjunction with the accompanying drawings.

DETAILED DESCRIPTION

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
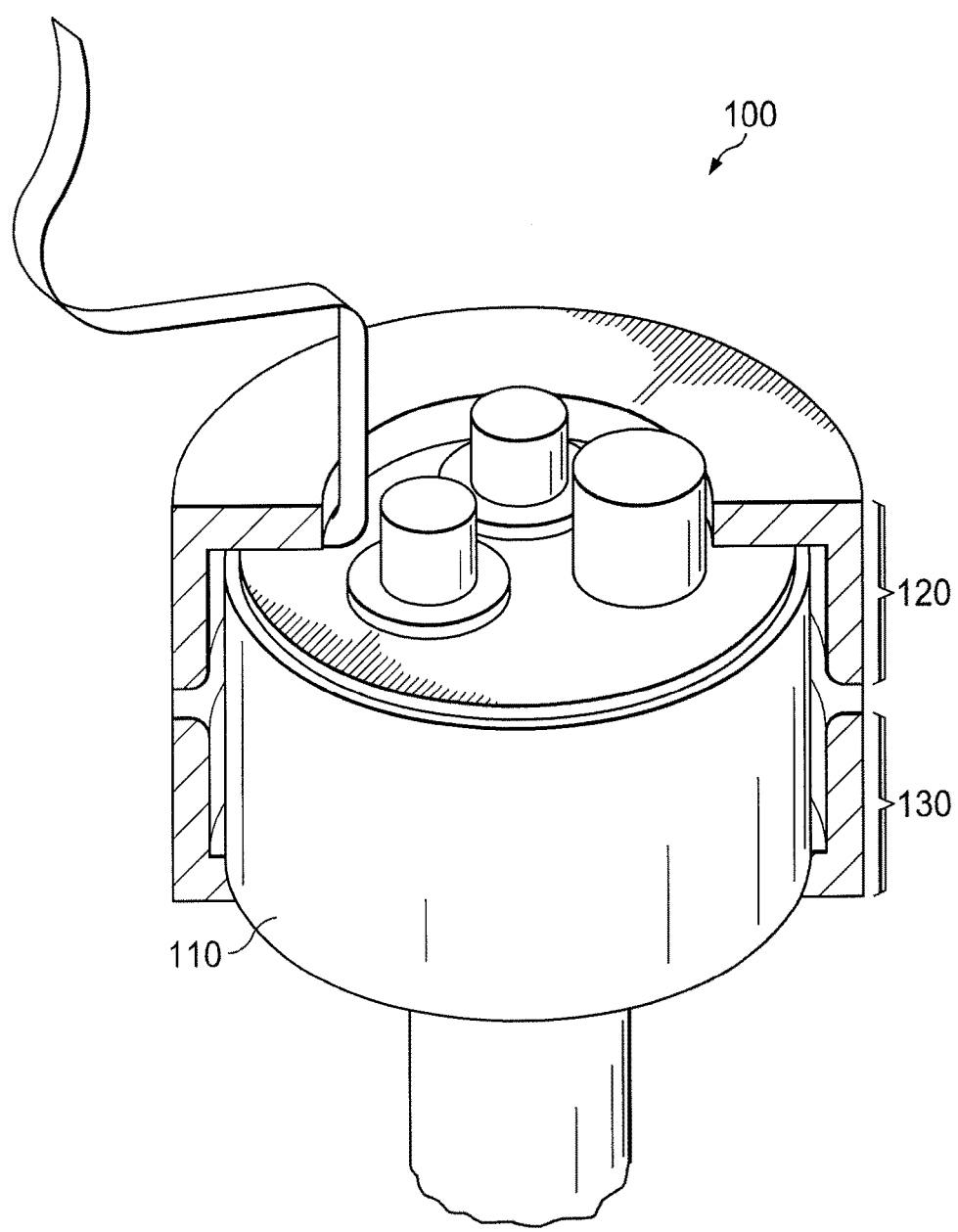
FIG. 1 is a diagram illustrating a capacitance diaphragm gauge in accordance with prior art.
Figure 2:
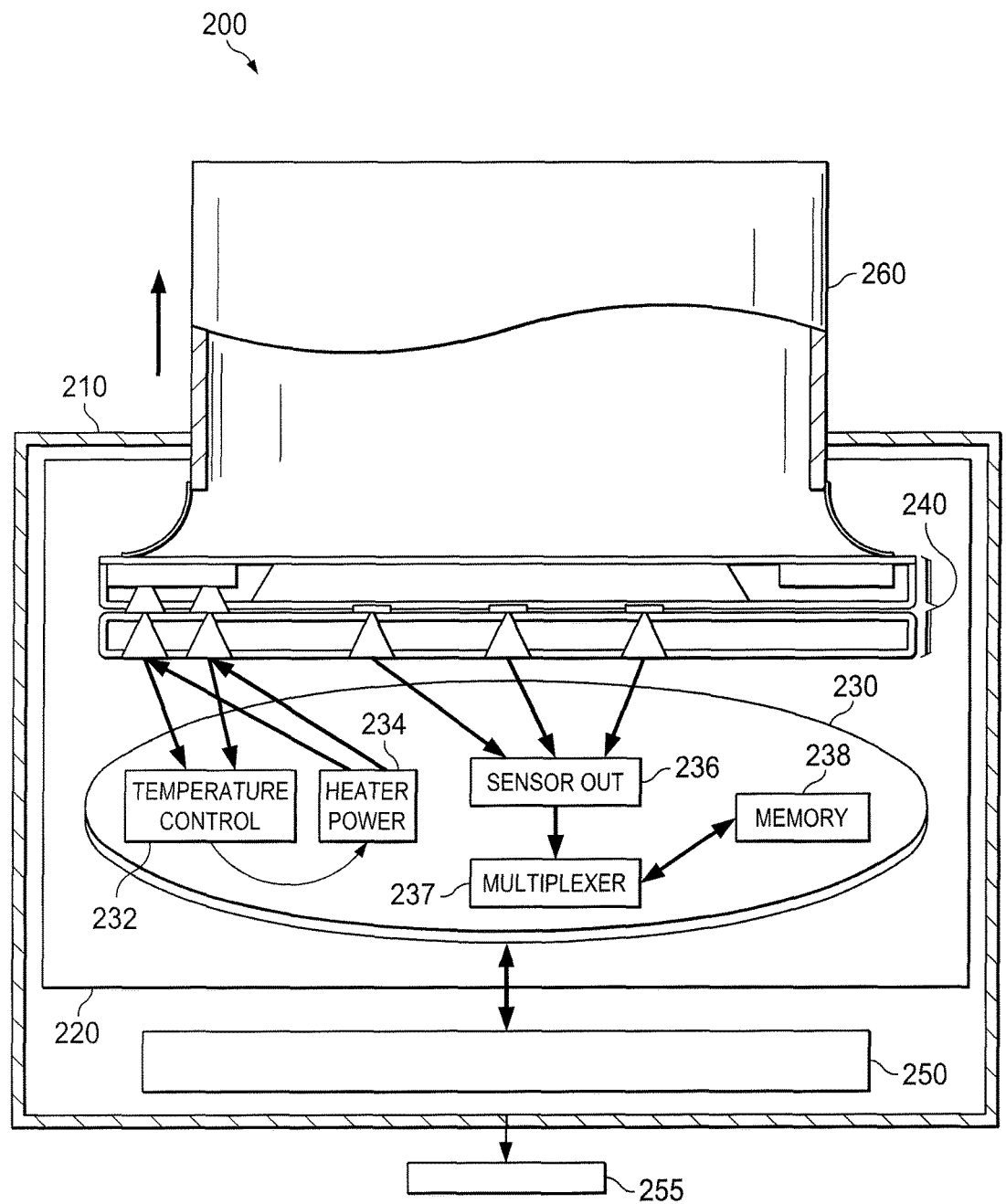
FIG. 2 is a diagram illustrating a capacitance diaphragm gauge in accordance with a disclosed embodiment.

Beginning with FIG. 2, a diagram illustrating a capacitance diaphragm gauge 200 in accordance with an embodiment of the invention is presented. Capacitance diaphragm gauge 200 comprises of an instrument housing 210. Inside the instrument housing 210, the capacitance diaphragm gauge 200 includes a sensor housing 220 that houses an analog front end (AFE) electronics board 230. The analog front end electronics board 230 is electrically couple to a micro-electro-mechanical-system (MEMS) sensor 240.

In certain embodiments, the MEMS sensor 240 includes two silicon dice bonded together by thermo-compression bonding. Other types of bonding techniques may also be used. One of the two silicon dice, a membrane chip, forms a diaphragm. The other die, an electrode chip, forms the pattern of electrodes that senses the diaphragm movement. In one embodiment, the side of the diaphragm that receives the process gasses may be coated with a metallic film (e.g. Ni and/or Cr) so as to render the diaphragm chemically inert. In another embodiment, the diaphragm may be untreated or naked.

In one embodiment, the MEMS sensor 240 includes one or more integrated heater components and temperature sensors that are manufactured on a silicon die of the MEMS sensor 240. The integrated heater components and temperature sensors are utilized to maintain an isothermal profile. Due to the small size of the MEMS sensor 240 and that the heater components are directly manufactured on the die, it is easier to maintain an isothermal profile of the MEMS sensor 240 as compared to the sensors of current capacitance diaphragm gauges. Additionally, the size of the MEMS sensor 240 further minimizes heat-loss between a process connection 260 to a customer's vacuum chamber and the MEMS sensor 240. Likewise, the sensory elements are easily suspended from or mounted to the inlet fitting, such that the isothermal profile is maintained to a desired temperature, such as, but not limited to, 45, 80, 100, 160 and 200 degrees Celsius to ensure that condensation does not occur.

The one or more integrated temperature sensors on the MEMS sensor 240 may be electrically coupled to a temperature control component 232 on the analog front end electronics board 230. The temperature control component 232 may communicate with a heater power component 234 for powering up or powering down the one or more integrated heater components on the MEMS sensor 240 for maintaining the isothermal profile. For example, as will be further described, in one embodiment, the MEMS sensors 240 may include four equally-spaced heater components integrated around the circumference of the MEMS sensor 240 so as to best maintain an isothermal profile. In one embodiment, the temperature control component 232 may control all of the heater components as a group, whereby all the heater components are set at the same temperature. Alternatively, in another embodiment, the temperature control component 232 may separately control one or more of the integrated heater components.

For example, if the temperature control component 232 detects that a particular portion of the MEMS sensor 240 has a lower temperature than other regions of the MEMS sensor 240, then the temperature control component 232 may transmit a signal to the heater power component 234 to increase the current to a particular heater component(s) corresponding to the lower temperature region of the MEMS sensor 240 in order to increase the temperature of that region so that the MEMS sensor 240 has a uniform temperature. Similarly, the temperature control component 232 may transmit a signal to the heater power component 234 to decrease the current to one or more heater components in order to lower the temperature of a certain region of the MEMS sensor 240.

In addition, the MEMS sensor 240 may output a sensor signal corresponding to a measured pressure to an analog signal conditioning component 236 on the analog front end electronics board 230, which may amplify the signal or manipulate the signal in other ways for further processing. The analog signal conditioning component 236 may communicate the conditioned analog signals to a signal multiplexer component 237 on the analog front end electronics board 230. The analog front end electronics board 230 may also include a memory component 238 that stores sensor specific calibration data for the MEMS sensor 240.

Figure 3:
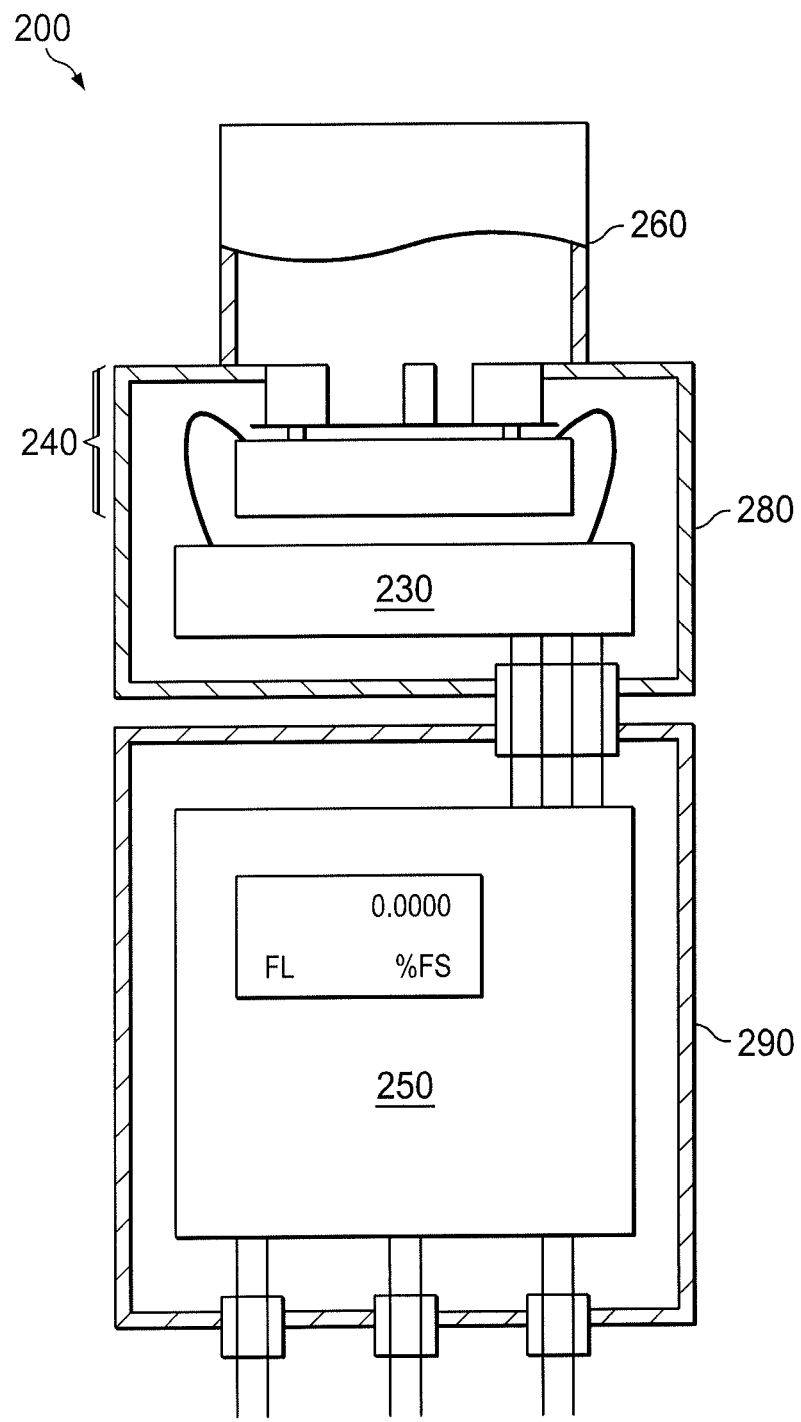
FIG. 3 is a diagram illustrating a capacitance diaphragm gauge having a replaceable cartridge in accordance with a disclosed embodiment.

Referring to FIG. 3, in one embodiment, the capacitance diaphragm gauge 200 may include a vacuum-sealed disposable sensor assembly or cartridge 280 which includes at least one of the MEMS sensor 240 and the analog front end electronics board 230. Utilizing various ports, leads, bond wires, or contacts, the disposable sensor assembly 280 is easily connected to or removed from a main body 290 of the capacitance diaphragm gauge 200 once the useful life of the sensors within the disposable sensor assembly 280 have been exceeded.

In one embodiment, the disposable sensor assembly 280 is approximately one-inch thick and easily added to or removed from the capacitance diaphragm gauge 200. In another embodiment, the sensors of the disposable sensor assembly 280 may be selected for specific applications or conditions and interchangeably removed or added to the capacitance diaphragm gauge 200 for maximum accuracy in measuring pressure.

The main body 290 of the capacitance diaphragm gauge 200 includes a second electronics circuit board 250. The second electronics circuit board 250 includes an interface for connecting the second electronics circuit board 250 to the analog front end electronics board 230. In one embodiment, the second electronics circuit board 250 includes an analog to digital converter that converts analog signals received from the analog front end electronics board 230 (e.g., from the multiplexer component 237) into digital signals for further processing. Alternatively, the analog front end electronics board 230 may include an analog to digital converter that converts analog signals prior to communicating the signals to the second electronics circuit board 250.

The second electronics circuit board 250 may include one or more microprocessors, memory, and a display connection for enabling configuration and testing of the capacitance diaphragm gauge 200 such as, but not limited to, performing zeroing, calibration, filtering/ranging computations, diagnostic, and alarm calculations. Customer-I/O connections and applications-specific configuration-data may be stored in memory on the second electronics circuit board 250 of the main body 290.

The second electronics circuit board 250 also includes analog-I/O and digital-I/O communication ports such as one or more of the user-connection ports 255 for interconnecting the capacitance diaphragm gauge 200 to other devices for data exchange. For instance, the user-connection ports 255 may include at least one of a DeviceNet™ port, a Modbus® port, and a Profibus™ port. The second electronics circuit board 250 may also include alarm-output connections, a power connection, and a diagnostics port (e.g. a laptop connection for in-situ checkout).

Thus, when a diaphragm of the MEMS sensor 240 is deemed to have been 'fouled' by chemical plating from the chamber beyond any compensation for zero or drift adjustments, the disposable sensor assembly 280 may be disconnected from the main body 290 of the capacitance diaphragm gauge 200 and replaced with a new disposable sensor assembly 280 sensor. In one embodiment, prior to replacing the disposable sensor assembly 280, any data stored in memory on the disposable sensor assembly 280 (e.g., manufacture calibration data) is written to memory in the main body 290 of the capacitance diaphragm gauge 200 and is ported over to the new disposable sensor assembly 280. Any non-sensor-specific data such as information about a particular customer-application remains intact within the non-discarded portion of the electronics. For example, the gas, application, and customer specific information may be stored in a non-volatile memory connected to the microprocessor. Thus, maintaining and repairing the capacitance diaphragm gauge 200 is easier, faster, and less costly than that associated with prior capacitance diaphragm gauges.

Figure 4:
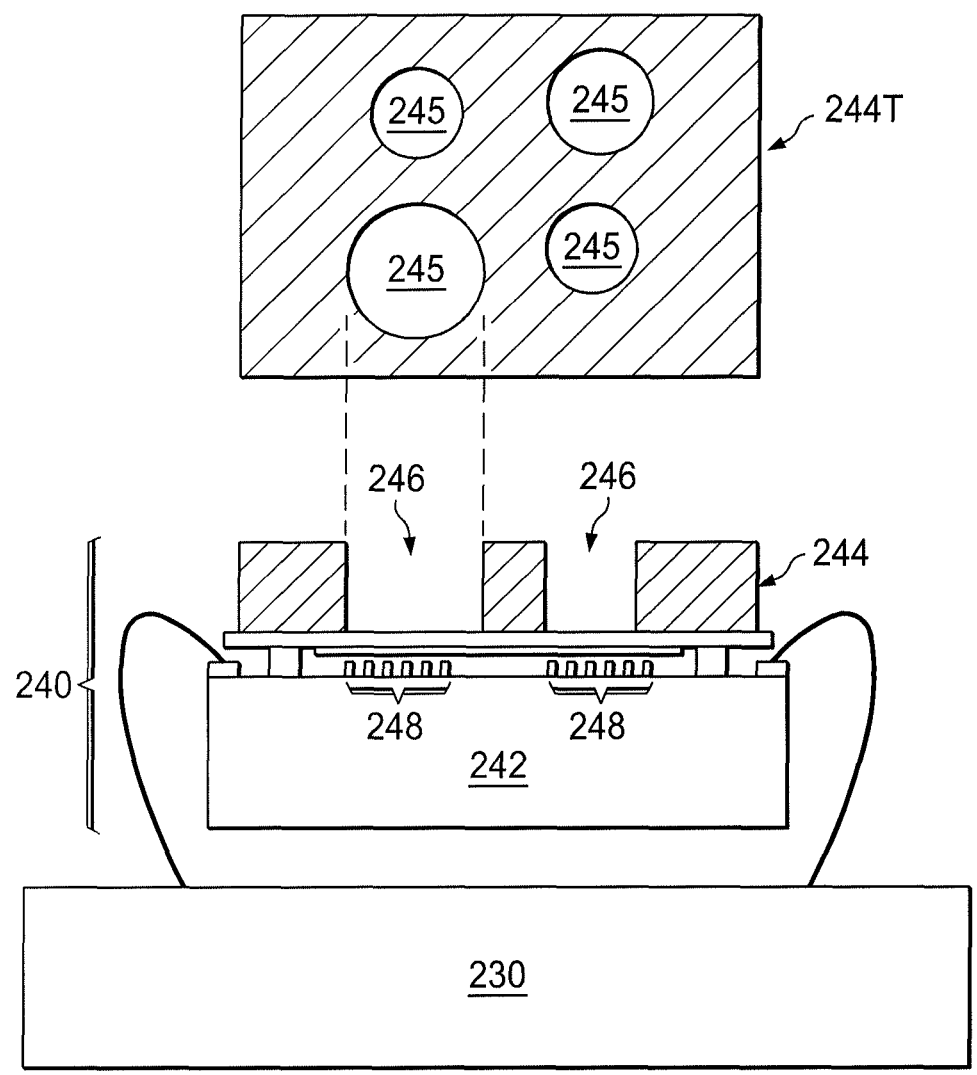
FIG. 4 is a diagram illustrating a illustrating a side view and a top view of a MEMS sensor in accordance with an embodiment.

Referring now to FIG. 4, a side view of the MEMS sensor 240 is presented. As stated above, in one embodiment, the MEMS sensor 240 may include an electrode chip 242 and a membrane chip 244 that are bonded together. FIG. 4 also depicts a top view 244T of the membrane chip 244.

In the depicted embodiment, the membrane chip 244 includes four diaphragms 245 of different diameters for measuring pressure. For example, the membrane chip 244 may include a 100 milliTorr (5 mm diaphragm), a 1 Torr (3 mm diaphragm), a 10 Torr (1.8 mm diaphragm), and a 100 Torr (1 mm diaphragm). As pressure rises, the diaphragms 245 are pushed inward towards corresponding cavities 246 of the membrane chip 244 that expose the diaphragm-material on its underside to the electrode chip 242.

The electrode chip 242 contains pattern for sensing distance to the deflecting diaphragms 245. The diaphragms 245 form one side of a capacitor that changes values when the diaphragms 245 get closer to the electrode chip 242 on the rear side. The changing capacitance is sensed electronically by sensors 248 on the electrode chip 242. In one embodiment, a larger diameter diaphragm has the same deflection with one-decade less pressure than a next smaller diaphragm. Thus, when one of the diaphragms 245 reaches its max deflection (bottoms-out), the next smaller diaphragm is still being displaced and becomes the diaphragm used for higher-pressure measurements.

In some embodiments, the signals from the sensors 248 may be activated or deactivated for particular ranges. For instance, the analog front end electronics board 230 may include a microprocessor that is configured to select the best of the four diaphragms to be active. As the customer's vacuum pressure goes up or down, the microprocessor selects the diaphragm which is in its 'sweet spot'. The microprocessor preferably selects the diaphragm that is displaced somewhere near the middle of its maximum range of deflection for the particular diaphragm. The signals from the sensors 248 may also be mathematically processed to provide more accurate measurements. For example, the signals from the sensors 248 may be separated digitally allowing the capacitance diaphragm gauge 200 to effectively measure pressures from 200 Torr to 10 mTorr. Portions of the analog front end electronics board 230 may be shared or distinct for each of the sensors 248. As a result, instead of using different capacitance diaphragm gauges for a plurality of different process pressures, a single capacitance diaphragm gauge 200 may be utilized. Likewise, the capacitance diaphragm gauge 200 may more accurately self-correct based on the measurements from the multiple sensors.

Figure 5:
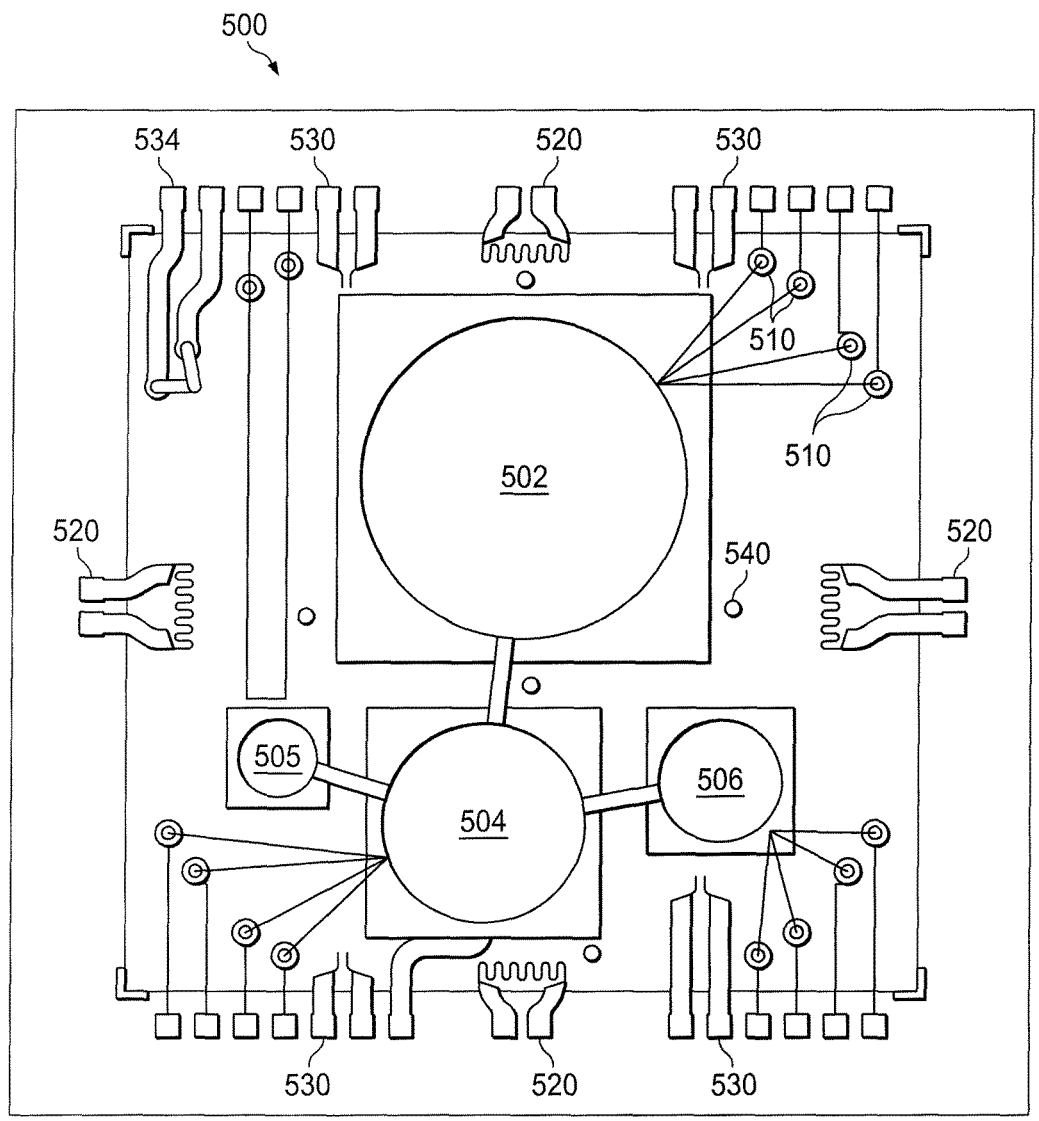
FIG. 5 is a detailed diagram illustrating the top view of a multi-range MEMs sensor in accordance with an embodiment.

FIG. 5 provides a detailed diagram illustrating a top view of a multi-range MEMs sensor 500 in accordance with an embodiment. The multi-range MEMs sensor 500 includes a 10 mTorr membrane 502, a 100 mTorr membrane 504, and a 1 Torr membrane 506. However, the number, placement, and measurement capacity of the membranes may vary between different designs of the multi-range MEMs sensor 500. For example, in some embodiments, the multi-range MEMs sensor 500 may not include the 10 mTorr membrane 502 due to a size restriction of the multi-range MEMs sensor 500.

Additionally, in one embodiment, the placement of the membranes on the multi-range MEMs sensor 500 is arranged so that all membranes fit within a 10 mm circle and have a minimum of 500 μm spacing between membranes. An example thickness for each of the membrane is 20 μm. Each of the membranes is electrically coupled to corresponding set of main bumps 510 (chip to chip interconnection) for communicating with the electrode chip 242 and to an electrode 505.

In the depicted embodiment, the multi-range MEMs sensor 500 includes four heaters 520. In one embodiment, the heaters 520 are identical and are located approximately in the middle on each side of the multi-range MEMs sensor 500. However, the number of heaters 520 and the location of the heaters 520 on the multi-range MEMs sensor 500 may vary between designs. In one embodiment, the heaters 520 consist of 4 filaments of 100 ohms each that are connected in parallel to create 1 heater of 25 ohms. Each filament may be made by a 1 mm long, 50 μm wide platinum track with a thickness of 100 nm.

Additionally, in the depicted embodiment, the multi-range MEMs sensor 500 includes 5 temperature sensors, four temperature sensors 530 located on the membrane chip 244 and one temperature sensor 534 is located on the electrode chip 242. The four temperature sensors 530 are used to sense the temperature at various places on the electrode chip 242. Temperature sensor 534 is used to sense the temperature of the membrane die, which is bonded atop the electrode die.

As stated above, in one embodiment, the four temperature sensors 530 may be separately sensed by the temperature control component 232 so as to individually adjust one or more heaters 520 on the multi-range MEMs sensor 500 for maintaining an isothermal profile. Thus, the four temperature sensors 530 provide the ability to ensure a low delta-T (change in temperature) across the multi-range MEMs sensor 500.

In one embodiment, each the temperature sensors is design to have a resistance at room temperature of 100 ohm and consists of a 500 μm long, 10 μm wide platinum track with a thickness of 100 nm. Similarly, the number of temperature sensors 534 and the location of the temperature sensors 534 on the multi-range MEMs sensor 500 may vary between designs.

In some embodiments, the multi-range MEMs sensor 500 may include secondary bumps 540. The secondary bumps 540 serve as support for the membrane to ensure that the separation between chips is constant across the sensor. The position of the secondary bumps may vary with the design.

Figure 6:
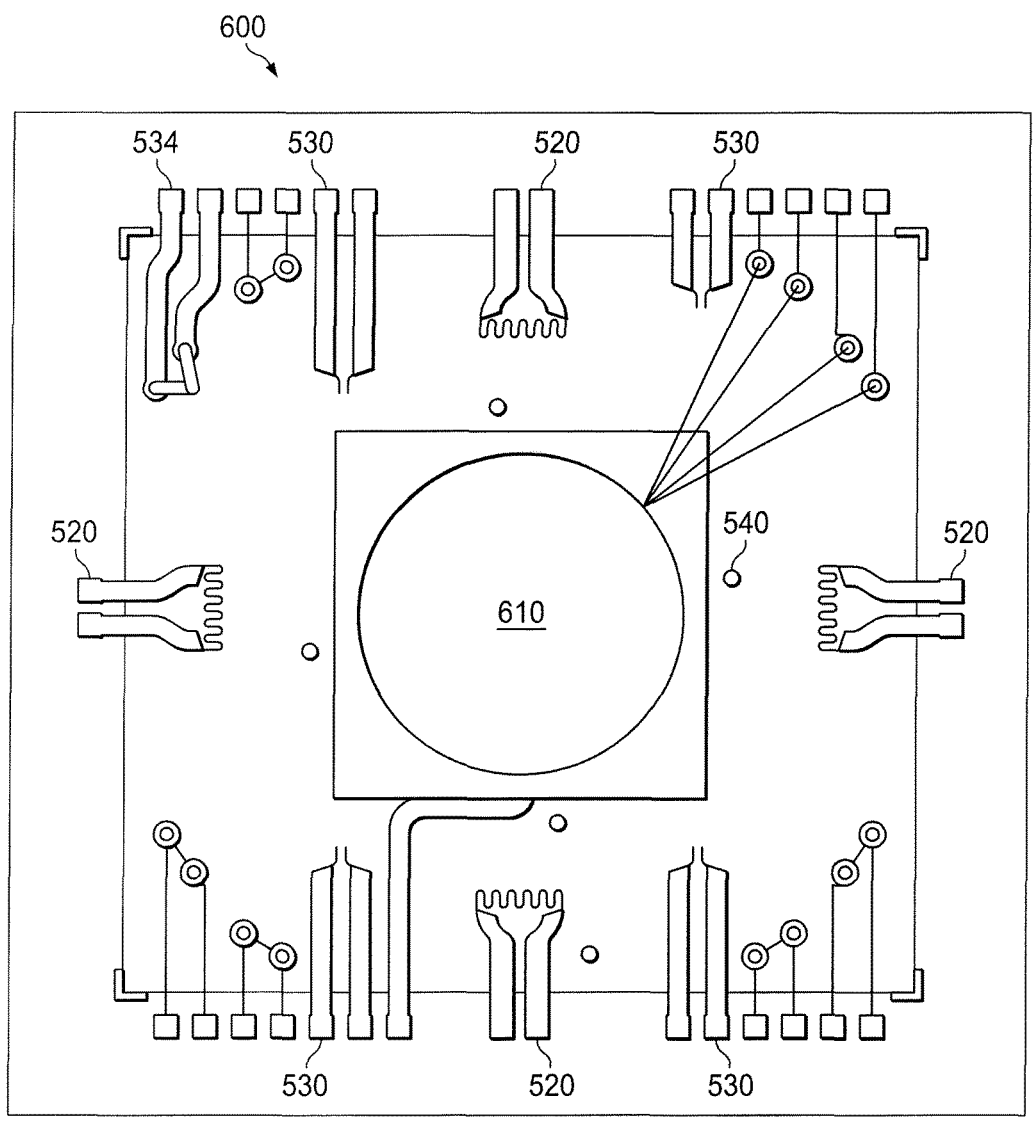
FIG. 6 is a detailed diagram illustrating a top view of a single range MEMs sensor in accordance with an embodiment.

FIG. 6 depicts a detailed diagram illustrating a top view of a single range MEMs sensor 600 in accordance with an embodiment. In the depicted embodiment, the sensor cartridge 600 differs from the multi-range MEMs sensor 500 in that it only contains a single membrane 610 that is located on the center of the chip. The number and location of the temperature sensors and heaters remain the same as the multi-range MEMs sensor 500.

Accordingly, the above disclosure describes several embodiments for providing a self-heated MEMS based capacitance diaphragm gauge. Advantages of the present invention include reduced effective form factor by replacing multiple discrete gauges with a multi-membrane sensor, reduced power dissipation, improved dynamic range by using multiple calibrated sensors in a single instrument, reduced cost of ownership, decreased down-time (shorter stabilization or faster ready to use period), and improved reliability due to reduced parts count and less power dissipation.

Although the present invention and its advantages have been described in detail, it should be understood that various changes, substitutions and alterations can be made herein without departing from the spirit and scope of the invention. For example, those of ordinary skill in the art will recognize obvious variations to the embodiments disclosed above and the scope of such variations are intended to be covered by the appended claims.

What is claimed is:

1. A capacitance diaphragm gauge, the capacitance diaphragm gauge comprising:
   a self-heated micro-electro-mechanical-system sensor for measuring pressure, the micro-electro-mechanical-system sensor including at least one heater component and multiple membranes integrated on a die of the micro-electro-mechanical-system sensor, each of the multiple membranes having a different pressure measuring range.

2. The capacitance diaphragm gauge of claim 1, wherein the self-heated micro-electro-mechanical-system sensor further comprises at least one integrated temperature sensor.

3. The capacitance diaphragm gauge of claim 2, wherein the self-heated micro-electro-mechanical-system sensor comprises five temperature sensors, said five temperature sensors consisting of four temperature sensors located on a membrane chip and one temperature sensor located on an electrode chip of the self-heated micro-electro-mechanical-system sensor.

4. The capacitance diaphragm gauge of claim 1, wherein the self-heated micro-electro-mechanical-system sensor further comprises an electrode chip and a membrane chip that are bonded together.

5. The capacitance diaphragm gauge of claim 1, wherein the self-heated micro-electro-mechanical-system sensor includes one of Nickel or Chromium on a process side of at least one of the multiple membranes.

6. The capacitance diaphragm gauge of claim 1, wherein all of the multiple membranes fit within a 10 mm circle.

7. The capacitance diaphragm gauge of claim 1, wherein the self-heated micro-electro-mechanical-system sensor includes a minimum of 500.mu·m spacing between membranes.

8. The capacitance diaphragm gauge of claim 1, wherein the self-heated micro-electro-mechanical-system sensor comprises four heater components.

9. The capacitance diaphragm gauge of claim 8, wherein each of the four heater components are placed substantially centered on each side of a four sides of the self-heated micro-electro-mechanical-system sensor.

10. A self-heated micro-electro-mechanical-system sensor for measuring pressure comprising:
    an electrode chip; and
    a membrane chip;
    the membrane chip comprising:
        at least one heater component; and
        multiple membranes on the membrane chip, wherein each of the multiple membranes comprises a different pressure measuring range.

11. The self-heated micro-electro-mechanical-system sensor of claim 10, further comprising at least one integrated temperature sensor component.

12. A capacitance diaphragm gauge, the capacitance diaphragm gauge comprising:
    a main housing comprising:
        at least one microprocessor, a second memory component; and
        at least one communication data port;
    and
    a replaceable cartridge operable to be connected and disconnected from the main housing, said replaceable cartridge comprising:
        a micro-electro-mechanical-system sensor for measuring pressure, the micro-electro-mechanical-system sensor comprises at least one heater component integrated on a die of the micro-electro-mechanical-system sensor; and
        an analog front end coupled to the self-heated micro-electro-mechanical-system sensor, and a first memory component;
    and wherein the at least one microprocessor is configured to execute instructions to export calibration data from the first memory component to the second memory component;
        and import the calibration data from the second memory component to a third memory component of a second replaceable cartridge for use with the main housing.

13. The capacitance diaphragm gauge of claim 12, wherein the micro-electro-mechanical-system sensor further comprises at least one integrated temperature sensor.

14. The capacitance diaphragm gauge of claim 12, wherein the micro-electro-mechanical-system sensor further comprises an electrode chip and a membrane chip that are bonded together.

15. The capacitance diaphragm gauge of claim 12, wherein the micro-electro-mechanical-system sensor comprises four of the heater components placed substantially centered on each side of the micro-electro-mechanical-system sensor.

16. A self-heated micro-electro-mechanical-system sensor for measuring pressure comprising:
    an electrode chip and a membrane chip bonded together by thermo-compression bonding;
    multiple membranes, each membrane having a different pressure measuring range, and wherein the pressure ranges are separated by at least a decade of measurement; and
    four heater components located substantially centered on each side of a four sides of the self-heated micro-electro-mechanical-system sensor, and five temperature sensors, the five temperature sensors including four temperature sensors located on the membrane chip and one temperature sensor located on the electrode chip of the self-heated micro-electro-mechanical-system sensor.

17. The self-heated micro-electro-mechanical-system sensor of claim 16, wherein all of the multiple membranes fit within a 10 mm circle.

18. The self-heated micro-electro-mechanical-system sensor of claim 16, wherein the self-heated micro-electro-mechanical-system sensor includes a minimum of 500.mu·m spacing between the membranes.

* * * * *